United States Patent [19]
Blizzard et al.

[11] Patent Number: 5,647,891
[45] Date of Patent: Jul. 15, 1997

[54] METHOD AND APPARATUS FOR HEATED, PRESSURE-SWING HIGH PRESSURE AIR DEHYDRATION

[75] Inventors: Ronald H. Blizzard, Annapolis; Cynthia T. Schell, Severna Park; Harry J. Skruch, Baltimore, all of Md.; Robert L. Stallings, Cary, N.C.

[73] Assignee: The United States of America as represented by the Secretary of the Navy, Washington, D.C.

[21] Appl. No.: 532,347

[22] Filed: Sep. 22, 1995

[51] Int. Cl.⁶ .................................................. B01D 53/047
[52] U.S. Cl. .............................. 95/99; 95/105; 95/106; 95/122; 95/126; 96/130; 96/133; 96/144
[58] Field of Search .................... 95/95–106, 119–126; 96/121, 130, 133, 144

[56] References Cited

U.S. PATENT DOCUMENTS

| | | | |
|---|---|---|---|
| 1,948,779 | 2/1934 | Abbott et al. | 95/120 |
| 2,345,774 | 4/1944 | Simpson | 95/105 |
| 2,747,681 | 5/1956 | Schuftan et al. | 95/99 X |
| 2,800,197 | 7/1957 | Wynkoop | 183/114.2 |
| 2,944,627 | 7/1960 | Skarstrom | 183/4.7 |
| 3,016,978 | 1/1962 | Hull | 96/130 X |
| 3,164,452 | 1/1965 | Westeren et al. | 95/123 X |
| 3,205,638 | 9/1965 | Hagle | 95/125 X |
| 3,282,027 | 11/1966 | Johnson et al. | 95/123 X |
| 3,448,561 | 6/1969 | Seibert et al. | 55/20 |
| 3,594,983 | 7/1971 | Yearout | 95/97 |
| 3,691,728 | 9/1972 | Vautrain et al. | 95/104 |
| 3,808,773 | 5/1974 | Reyhing et al. | 95/104 |
| 3,899,684 | 8/1975 | Tenney | 96/130 X |
| 4,127,395 | 11/1978 | McKey et al. | 55/20 |
| 4,197,095 | 4/1980 | White, Jr. et al. | 55/20 |
| 4,203,958 | 5/1980 | Snarski | 96/130 X |
| 4,331,456 | 5/1982 | Schwartz et al. | 95/99 X |
| 4,439,213 | 3/1984 | Frey et al. | 96/130 X |
| 4,546,442 | 10/1985 | Tinker | 364/500 |
| 4,565,685 | 1/1986 | Cassano | 423/579 |
| 4,605,425 | 8/1986 | Verrando et al. | 55/20 |
| 4,711,645 | 12/1987 | Kumar | 95/98 |
| 4,846,852 | 7/1989 | Schweitzer et al. | 95/125 |
| 4,898,599 | 2/1990 | Settlemyer | 95/126 X |
| 4,983,190 | 1/1991 | Verrando et al. | 95/98 X |
| 5,213,593 | 5/1993 | White, Jr. | 95/99 |
| 5,271,762 | 12/1993 | Schoofs et al. | 95/120 |
| 5,298,054 | 3/1994 | Malik | 95/99 |

FOREIGN PATENT DOCUMENTS

| | | | |
|---|---|---|---|
| 1-018426 | 1/1989 | Japan | 95/123 |
| 5-103938 | 4/1993 | Japan | 95/99 |
| 0593359 | 10/1947 | United Kingdom | 95/99 |

*Primary Examiner*—Robert Spitzer
*Attorney, Agent, or Firm*—Howard Kaiser

[57] ABSTRACT

Method and apparatus for separating gases, especially for removing water vapor from a gas such as air. This invention uses a short-cycle process which produces reduction in dewpoint (for dehydrating gas separation processes) or change in gas concentration (for non-dehydrating gas separation processes) at high pressure, and which includes adding a short burst of heat during the beginning of the reactivation cycle to boost desorption and complete it typically in about thirty minutes or less time. An easily desorbed desiccant (or other adsorbent material for non-dehydrating applications) and the short low-temperature burst of heat serve to reactivate a significant portion of the desiccant bed (or adsorbent bed), and the cooler purge fluid that follows cools that portion of the bed in preparation for the next drying (or adsorbing) cycle.

20 Claims, 1 Drawing Sheet

METHOD AND APPARATUS FOR HEATED, PRESSURE-SWING HIGH PRESSURE AIR DEHYDRATION

The invention described herein may be manufactured and used by or for the Government of the United States of America for governmental purposes without the payment of any royalties thereon or therefor.

BACKGROUND OF THE INVENTION

This invention relates to methods and apparatuses for fractionating or separating gases, more particularly to such methods and apparatuses which operate cyclically using adsorbant material.

Heat-reactivated desiccant dehydrators (temperature-swing desiccant dehydrators) generally operate on a four-hour cycle in which two towers are alternately on-line and reactivated. They are reactivated by heating, alternately, the entire bed of each tower to 400° F. to 800° F. and then cooling them back to near the inlet air temperature. The long cycles depend on an efficient, high capacity desiccant and a long, hot purge cycle to desorb the bed. In order to provide this heat, large internal and/or external heaters are required. These high temperature heaters cause many reliability problems and reduce desiccant life, among other disadvantages. Also, because the desiccant is a good insulation material, the heat is not distributed well and the entire towers may not be fully reactivated. Where short operating periods (on the order of less than one hour) are required, complete reactivation of a tower is prevented from occurring.

Pressure-swing desiccant dehydrators have been considered and attempted but have not been successfully demonstrated for high pressure, short-cycle operations. Pure pressure-swing dehydrators operate without the external addition or removal of heat and depend on a short cycle, on the order of minutes or seconds. In such systems, only the outer layer of the desiccant particle material effectively adsorbs water vapor, desorption being accomplished by passing dried low-pressure air through the bed. This desiccant regeneration method does not desorb adequately enough water vapor to meet stringent dehydrator performance requirements. In drying air, desorption is further hampered by the Joule-Thomson cooling effect which occurs when high-pressure air is depressurized and by the endothermic cooling effect which occurs with water vapor desorption.

Skarstrom U.S. Pat. No. 2,944,627 discloses the fractionating of a gaseous mixture by adsorption; in specific application, Skarstrom discloses the drying of a gaseous mixture such as air by removal of water vapor.

Cassano U.S. Pat. No. 4,565,685 discloses the use of a combination of temperature swing and pressure swing absorption-desorption sequence procedures to cyclically provide a continuous separation of the components of air, and specifically oxygen, from air.

Seibert et al. U.S. Pat. No. 3,448,561 and McKey et al. U.S. Pat. No. 4,127,395 disclose method and apparatus for adsorbing water vapor from a mixture thereof with a second gas to reduce the water vapor concentration in the mixture to below a permissible maximum concentration. The Seibert et al. reference and the McKey et al. reference each disclose a process which includes removing sorbed water vapor from a bed of a sorbent at a pressure below the pressure at which adsorption is effected or at an elevated temperature sufficient to desorb the water vapor.

White, Jr. et al. U.S. Pat. No. 4,197,095 disclose method and apparatus for adsorbing one or more first gases from a mixture thereof with a second gas to reduce the concentration of the first gas(es) in the mixture to below a permissible maximum concentration.

Seibert et al., McKey et al. and White, Jr. et al. disclose applicability of their respective inventions to systems wherein no heat is applied to the desiccant bed to effect regeneration, to systems wherein part or all of the desiccant bed is heated to effect regeneration, to systems wherein regeneration is effected at reduced pressure, to systems utilizing a purge-gas flow, and to systems combining one or more of these features.

SUMMARY OF THE INVENTION

The aforesaid references, singly or in combination, neither teach nor suggest the method and apparatus of the present invention. Among the features of the present invention which are not disclosed by the aforesaid references are the utilization of an easily desorbed adsorbent material (desiccant, for dehydrating applications) having sufficient drying capacity, and the effectuation of a short low-temperature burst of heat to boost desorption. In accordance with the present invention, the use of an easily desorbed adsorbent material enhances the effect of the heat increase. This invention advantageously succeeds in significantly reducing the cycle durations as well as in applying a moderate increase in heat during the beginning of the reactivation cycle to boost desorption. The present invention is capable of meeting stringent performance requirements.

The present invention provides method and apparatus for separating gases. The terms "gas" and "gaseous," as used herein, include reference to any substance which is conventionally considered to be a gas or gaseous or in a gaseous state, for example air, and also include reference to any substance which is conventionally considered to be a vapor or vaporous or in a vaporous state, for example water vapor. For many applications of this invention, water vapor is separated from air; i.e., the air is dehydrated. The short-cycle process of this invention produces, at high pressure, change in gas concentration. For dehydrating gas separation processes, this change in gas concentration may be thought to be manifested as reduction in dewpoint.

According to many embodiments of this invention, a short burst of heat is added during the beginning of the reactivation cycle to boost desorption. The reactivation cycle is completed typically in about thirty minutes or less time. Utilization of an easily desorbed adsorbent material (desiccant, for dehydrating applications) and implementation of a short low-temperature burst of heat serve to reactivate a significant portion of the adsorbent bed (desiccant bed, for dehydrating applications); in preparation for the next drying cycle, that portion of the bed is cooled by the cooler purge fluid that follows.

For dehydrating applications, the present invention concerns apparatus and method for accomplishing short-cycle operation of high-pressure pressure-swing desiccant dehydrators, for example wherein a −60° F. dewpoint at 3000–4500 psig is achieved by adding a burst of heat during the beginning of the reactivation (purge) cycle. According to this invention, the effect of the burst of heat is enhanced by utilization of an easily desorbed desiccant.

In a preferred embodiment, an in-line heater is energized to heat the desiccant bed's inlet low-pressure purge air, i.e., expanded product air, to about 200° F. for the first several minutes of the purge cycle; the heater is then turned off for the rest of the purge cycle. The heat increase, which preferably is in the form of a burst, allows shorter operating periods and is more tolerant of cycle interruptions.

It will be appreciated that other modifications of this invention are possible in the light of the teachings herein. For example, the heat burst of the invention can be adapted to different operations, the dehydrator can be optimized for the operating conditions, the dehydrator bed can be used with desiccant combinations to enhance performance, and the heat-burst concept can be adapted for other gas separation processes.

Figure 1:
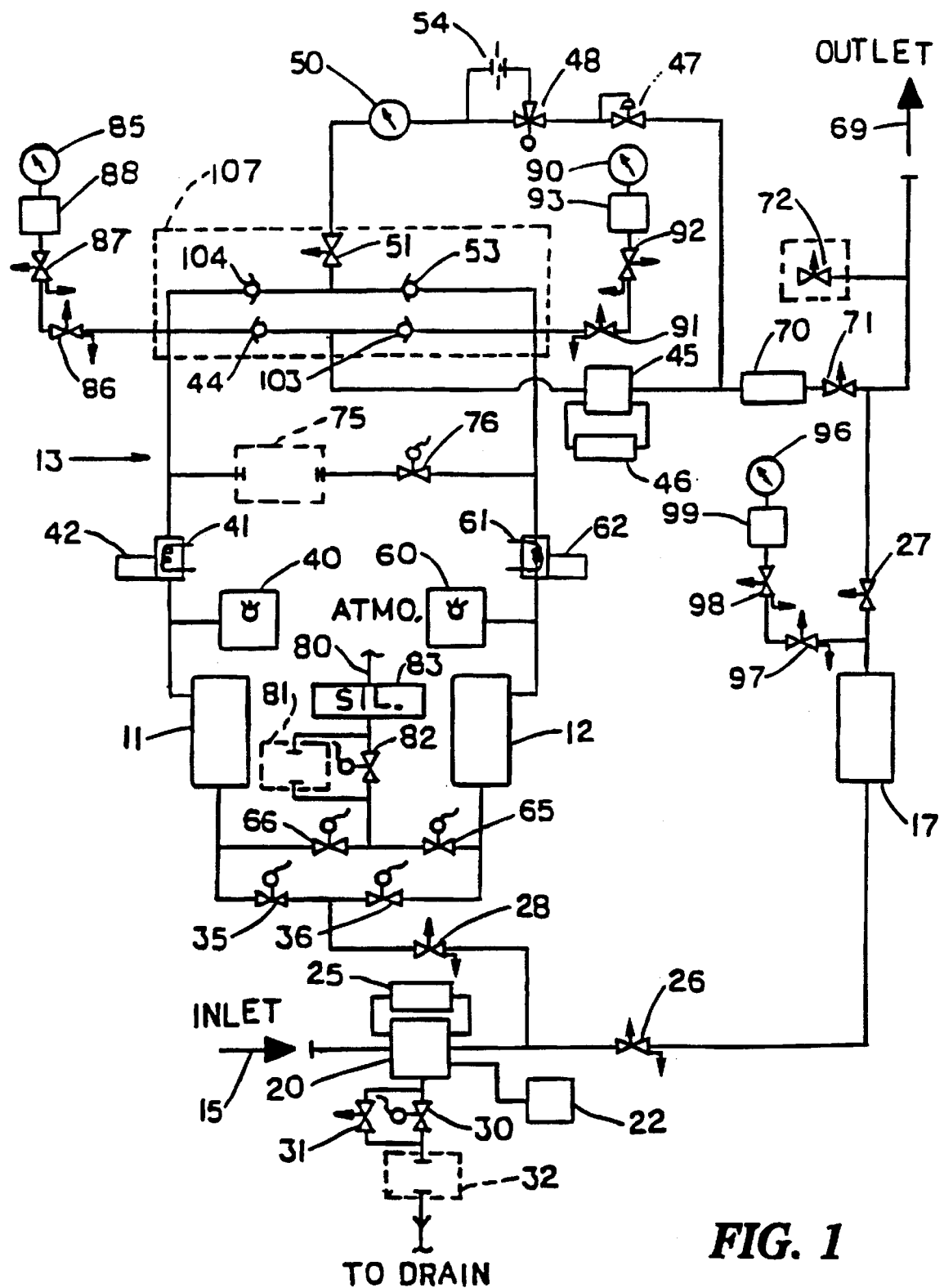
FIG. 1 is a diagrammatic view of an embodiment of the present invention.

Two desiccant towers 11 and 12 are disposed in separate branches of a controlled flow dehydrator, generally indicated at 13, to alternately adsorb water vapor from a feed air stream entering through an inlet 15. Each tower contains an easily desorbed desiccant, e.g., one containing open-pore particles, not shown, having a sufficient drying capacity such as Alcoa F-200 activated alumina.

A third tower 17, which is manually operated, provides an emergency backup method of producing dry air in the event of cycle failure. Under emergency mode operation, to provide maximum operating time, the backup desiccant tower 17 contains desiccant material having a high adsorption capacity, not easily desorbed desiccant material.

DETAILED DESCRIPTION OF THE INVENTION

Referring now to FIG. 1, free moisture and particulate matter are removed from inlet air by prefilter 20, after which the air passes upward through either tower 11 or 12 where water vapor is adsorbed from the air for a period of approximately thirty minutes.

For further discussion, assume the high-pressure inlet air undergoing dehydration is passing through tower 11. Afterfilter 45 removes desiccant particles before the air is discharged into a sealed enclosure, such as a submarine's air system, through backpressure regulating valve 70 which is set to open at about 4200 psig. Simultaneously, a small portion of product air is bled off of the product air stream downstream of the afterfilter and is expanded through pressure regulating valve 47 to about 80 psig. The product air passes over heater 61, in a preferred embodiment an 800 Watt cartridge heater, to a temperature of about 200° F. for the first few minutes of the approximately thirty-minute reactivation period. This air, which is identified as purge air, then passes downward through off-line tower 12 to reactivate the desiccant in it.

At the end of the reactivation period, off-line tower 12 is pressurized over about a one-minute period through pressurization solenoid valve 76, to prepare it for high pressure adsorption. The towers then switch, and the now off-line tower 11 is then depressurized over about a two-minute period before the purge flow begins. These controlled pressurizations and depressurizations minimize noise and damage to the desiccant particles during these pressure cycles. Since dehydrator 13 may operate in either a one-compressor or two-compressor mode, it automatically begins operation when either or both compressors start. Automatic valve 48 directs the purge air through the proper restriction (orifice 54, if required) to control the purge flow to match the number of compressors in operation.

Solenoid operated valves and check valves direct the air flows, and an automatic controller monitors the valve sequencing, heater operation and flow and temperature alarms. Since significant air losses occur during the depressurization process, the purge air losses are set low enough that about a 10% total air loss requirement is achieved.

The air entering at inlet 15 passes through a coalescing prefilter 20 where its temperature is sensed at inlet temperature sensor 22 and its pressure is sensed and indicated at a differential pressure indicator 25. An inlet bypass valve 26 and an outlet bypass valve 27 when closed direct the air stream through a manual cutout valve 28 by means of which entry into dehydrator 13 is achieved. Accumulated water in the prefilter 20 is drained, when necessary, through a solenoid operated blowdown valve 30, a manual blowdown valve 31, and a frictional throttling tube 32.

The system may be operated at 75 scfm using a single air compressor, not shown, or at 150 scfm using two compressors. Inlet air enters tower 11 via a solenoid-operated valve 35 and is prevented at this point from entering tower 12 by a solenoid-operated valve 36. The high-pressure dehydrated air, after passing through tower 11, passes through a check valve 44 and an afterfilter 45 where its pressure is indicated by a differential pressure indicator 46. After a desired operating pressure is achieved, a backpressure valve 70 opens and releases the dry air through an open manual cutout valve 71 and the outlet 69. The dewpoint of the discharged air is determined through a dewpoint sample connection 72. A desired volume of the dry outlet air is redirected as purge air for the second tower 12. This purge air passes through a pressure reducing regulator valve 47, a solenoid-operated valve 48, a flow controlling orifice 54 (if required), a flowmeter 50, a purge throttle valve 51, and a check valve 53.

Before entering tower 12, the purge air temperature is controlled by a temperature controller 60, a reheater 61, and a temperature switch 62. The purge air passes through tower 12, reactivating or desorbing the desiccant within, and is vented to the atmosphere by passing through solenoid-operated valves 65 and 82, noise silencer 83, and outlet 80. After a desired volume of air has entered the system, solenoid-operated valves 65 and 82 close. Tower 12, which is effectively at atmospheric pressure, is pressurized in preparation for being placed on-line to dehydrate the inlet air 15. This is accomplished by opening solenoid-operated valve 76 allowing dry high pressure air from tower 11 to enter tower 12 through a frictional throttling tube 75.

Once the desired pressure is obtained in tower 12, solenoid-operated valve 76 closes, solenoid-operated valve 36 opens and solenoid-operated valve 35 closes, reversing the inlet air flow from tower 11 and into tower 12. The dry high-pressure outlet air from tower 12 then passes through check valve 103, afterfilter 45, backpressure valve 70, and manual cutout valve 71 and is discharged through outlet 69. At the same time, tower 11 is depressurized in preparation for its reactivation cycle. The high pressure air within tower 11 is vented to atmosphere through open solenoid-operated valve 66, frictional throttling tube 81, silencer 83, and outlet 80.

After the desired volume of air has been released from tower 11, solenoid-operated valve 82 opens and purge air flow begins through tower 11 (just as occurred through tower 12). The purge air passes through pressure reducing regulator valve 47, solenoid-operated valve 48, flow controlling orifice 54 (if required), flowmeter 50, purge throttle valve 51 and check valve 104. Before entering tower 11, purge air temperature is controlled by a temperature controller 40, a reheater 41, and a temperature switch 42. The purge air passes through tower 11, reactivating the desiccant within, and is vented to atmosphere through open solenoid-operated valves 66 and 82, silencer 83, and outlet 80.

The cycle continues in this fashion by the control of air pressures and flows by the various valves and regulation of purge air temperatures by the reheaters and controllers. In this manner the towers are alternately placed in a reactivation mode and an adsorption mode (removing the moisture from the inlet air).

The pressure in tower 11 is indicated by a pressure gauge 85 which is joined to tower 11 via a block valve 86, a vent valve 87, and a gas snubber 88. The pressure in tower 12 is indicated by a pressure gauge 90 which is joined to tower 12 via a block valve 91, a vent valve 92, and a gas snubber 93. The means by which a burst of heat is added during the reactivation cycle include reheaters 41 and 61. Outlet manifold 107 includes check valves 44, 53, 103 and 104 and purge throttle valve 51.

In the event of a cycle failure, bypass tower 17 may be used to produce dry air. Opening manual cutout valves 26 and 27 and closing manual cutout valves 28 and 71 direct the inlet air 15 through bypass tower 17 after passing through the prefilter 20. The pressure in the bypass tower 17 is indicated by a pressure gauge 96 which is joined to bypass tower 17 via a block valve 97, a vent valve 98, and a gas snubber 99.

In a preferred embodiment, developed by the U.S. Navy, compactness is achieved by mounting all components on a base frame to accommodate a 28-inch wide, 26-inch deep and 54-inch high (approximate dimensions) dehydrator whose estimated dry weight is about 1500 pounds. The two cylindrical desiccant towers 11 and 12 each measure about 8 inches outside diameter and about 29.75 inches long. Desiccant towers 11 and 12 each contain approximately 570 cubic inches of granular desiccant arranged in a cylindrical bed measuring about 5.5 inches in diameter and about 24 inches deep. The cylindrical emergency bypass tower, containing about 159 cubic inches of high adsorption granular desiccant, measures about 5 inches outside diameter and about 25.63 inches long. This embodiment of the present invention is considered to meet the −60° F. pressure dew point requirement at 3000–5000 psig with 75° F. saturated inlet air temperature, and to operate in ambient temperatures between 40° F. and 122° F. at 50 percent relative humidity.

It will be appreciated that the present invention differs substantially from the reactivation of heat-reactivated dehydrators in that, among other distinctions, the maximum 200° F. purge air temperature is much lower than the 400° F. to 800° F. required during a typical heat-reactivation cycle, and the duration of the heat burst is only a small portion of the purge cycle. This lower temperature eliminates unreliabilities associated with high temperatures on heaters, valves and other components. The system of the present invention relies primarily on pressure for reactivation; hence, heat distribution does not present a problem since it only acts as a booster. Having the heaters located immediately upstream of the purge inlet of the desiccant towers and external to the desiccant bed also improves system reliability. Moreover, the short, low temperature heat burst permits rapid cooling of the towers.

Among other advantages, the present invention uses only the water-holding capacity of the outer surface of open-pore desiccant particles and thus is more dependent on desorption efficiency than on adsorption efficiency. A desiccant with small pores or one that is too efficient in adsorption capacity will not desorb properly. Therefore, among the principal features of this invention is the use of an easily desorbed desiccant with desorption in order to meet performance requirements for short-cycle operation. Also, short cycles do not require long dehydrator operations and are more compatible where compactness of equipment is a necessity. The system is fully automatic and is energy efficient.

In practicing the removal of water vapor from air (or the removal of water vapor from another gas) in accordance with present invention, modification or optimization of one or more operational parameters (e.g., desiccant tower configuration, inlet throughput rate, product dew point, product discharge pressure, regeneration purge pressure and flow rate, and heat burst temperature and duration) can produce a desired dew point product; among the multifarious embodiments and applications of this invention, such selectivities can be accomplished over wide ranges of throughputs, operating pressures (e.g., adsorption pressures, regeneration pressures) and dew points.

Hence, water vapor removal from air (or another gas) can be effectuated according to this invention whereby at least one operational parameter substantially differs (e.g., in terms of desiccant tower configuration or in terms of a parameter value which is substantially higher or lower) with respect to the corresponding operational parameter in the example described hereinabove with reference to FIG. 1. For example, the ordinarily skilled artisan practicing this invention can modify one or more operational parameters so as to produce a dehumidified product air (or another dehumidified product gas) having a dew point which is anywhere in a range from slightly below the inlet condition dew point to below −80° F.

Furthermore, according to varying methods and apparatuses of this invention, water vapor can be removed from air inlet streams (or gas inlet streams) at pressures ranging from near atmospheric pressure (14.7 psi absolute) to pressure above 5000 psig. In the light of the teachings herein the ordinarily skilled artisan can design the appropriate hardware for the intended pressure. For embodiments wherein the adsorption pressure is near atmospheric, desiccant regeneration is carried out at subatmospheric pressure (vacuum).

Moreover, the present invention can operate at throughputs below the 75 scfm and above the 150 scfm dislosed in the above example described with reference to FIG. 1. The ordinarily skilled artisan can accomplish this by adjusting (primarily dimensionally) the configuration of one or more desiccant towers and/or by adjusting one or more other operating parameters (e.g., heat burst maximum temperature and duration, cycle timing, and regeneration purge pressure and flow rate).

In addition to applications involving dehydration of air or dehydration of a gaseous substance other than air, the present invention encompasses non-dehydrating applications. Through appropriate modification of the adsorbent material towers, selection of appropriate adsorbent material, and optimization of other operating parameters, the ordinarily skilled artisan can practice the principles of the present invention for effectuating separation of vapors or gases wherein an anhydrous gaseous substance is removed from another gaseous substance.

The combination of the heat burst and the difference in adsorption and regeneration pressures synergistically affords distinct benefits in achieving high degrees of separation and long-term stabilities of operation and performance. In accordance with this invention, for instance, a low vapor pressure component such as oil vapor can be removed from an air or from a non-air gas. For such embodiments the heat burst can be effective in preventing the gradual accumulation in the adsorbent bed material of the low vapor pressure constituent; such accumulation could shorten the operating life of the adsorbent bed and deteriorate separation performance.

Examples of adsorbent materials which can be appropriately or preferably used, either singly or in some combination, as the desiccant material (for dehydrating applications) or other adsorbent material (for non-dehydrating applications) in practicing a given embodiment of this invention, include but are not limited to activated aluminas, activated carbons and zeolites. In practice of this invention, the ordinarily skilled artisan can select the appropriate desiccant or other adsorbent material for optimizing relative adsorption and desorption or reactivation performance. It is within the ordinary skill in the art to practice the generate relative regarding optimization of the relative adsorption and desorption performance as relating the nature of the equilbrium adsorption and desorption isotherms (hysteresis) and molecular transport rates in the adsorbent pore structure.

Parameters such as cycle duration, heat burst duration, applied heat burst temperature and adsorbent bed size are adjustable by the ordinarily skilled artisan in accordance with the overall constraints and performance requirements of the particular application of this invention which is practiced. The ordinarily skilled artisan who practices this invention will have sufficient familiarity with the interrelationships among these parameters and the engineering "trade-offs" involved in their adjustments. In terms of some general upper limits for practicing most embodiments of this invention, the duration of the combined adsorption and reactivation cycle will not exceed 60 minutes, the duration of application of the heat burst will not exceed about 70 percent of the duration of the reactivation cycle, and the temperature of the heat burst as applied will not exceed 300° F.

Generally speaking, for embodiments akin to that described in the example hereinabove with reference to FIG. 1, wherein the adsorption cycle is approximately 30 minutes and the reactivation cycle is approximately 30 minutes, the heat burst which is applied at the beginning of the reactivation cycle at about 200° F. will have a duration of about 17 minutes. In general when practicing this invention, the heat burst should be effectuated early in the reactivation cycle and its duration should be appreciably less than that of the reactivation cycle, the main consideration being that the adsorbent bed thereby be allowed to cool before the adsorbent bed is returned to the adsorption cycle.

Although this invention has been disclosed and described with reference to particular embodiments, its principles are susceptible to other applications, some of which already have been mentioned, to persons skilled in the art.

What is claimed is:

1. A process for adsorbing water vapor from hydrated gas so as to obtain dehydrated gas, said process comprising:

supplying a short-cycle dehydrator having at least one tower containing a desiccant which is characterized by relative inefficiency of adsorbing said water vapor from said hydrated gas and by relative efficiency of being desorbed of said water vapor, said dehydrator providing for at least one alternation of a desiccant adsorption cycle and a desiccant reactivation cycle, each said alternation not exceeding about one hundred twenty minutes duration;

introducing said hydrated gas into at least one said tower for effecting said desiccant adsorption cycle whereby said hydrated gas flows through each said tower at a relatively high pressure in a substantially upward direction, said water vapor is substantially adsorbed by said desiccant, and said dehydrated gas is discharged from said tower; and introducing purge fluid into at least one said tower for effecting said desiccant reactivation cycle whereby said purge fluid flows through said tower at a relatively low pressure in a substantially downward direction, said water vapor is substantially desorbed from said desiccant, and said purge fluid accompanied by some said water vapor is discharged from said tower, said introducing purge fluid including effecting a temperature increase of said purge fluid toward the beginning of said desiccant reactivation cycle and effecting a temperature decrease of said purge fluid toward the end of said desiccant reactivation cycle, said temperature decrease cooling said desiccant subsequent to said temperature increase, said temperature increase being to a temperature not exceeding about three hundred degrees Fahrenheit, said temperature increase not exceeding about seventy percent of the duration of said desiccant reactivation cycle, said temperature increase being of sufficiently long duration and to a sufficiently high temperature as to significantly boost desorption of said desiccant and being of sufficiently short duration and to a sufficiently low temperature as to minimally impair the adsorption efficiency of said desiccant.

2. A process for adsorbing water vapor as in claim 1, wherein said desiccant is selected from the group consisting of activated aluminas, activated carbons and zeolites.

3. A process for adsorbing water vapor as in claim 1, wherein:

said introducing hydrated gas is into at least two said towers and said introducing purge fluid is into at least two said towers; and said desiccant adsorption cycle for at least one said tower is substantially synchronous with said desiccant reactivation cycle for at least one other said tower, whereby said purge fluid which is introduced in correspondence with at least one said desiccant reactivation cycle is derived from said dehydrated gas which is discharged in correspondence with at least one said desiccant adsorption cycle.

4. A process for adsorbing water vapor as in claim 3, wherein said temperature increase is to a temperature not exceeding about 200° F., and at least one said reactivation cycle is accomplished in about thirty minutes, so that a pressure dewpoint of about −60° F. at about 4500 psig is achieved for said dehydrated gas during the next said adsorption cycle.

5. A process for adsorbing water vapor as in claim 1, wherein said hydrated gas is hydrated air and said dehydrated gas is dehydrated air.

6. Apparatus for adsorbing a first gaseous substance from a second gaseous substance via a short-cycle process, said second gaseous substance including said first gaseous substance and a third gaseous substance, said apparatus comprising:

at least one tower, each said tower containing an adsorbent material which is adapted, in terms of composition and porosity, to less efficiently adsorbing said first gaseous substance from said second gaseous substance and to more efficiently being desorbed of said first gaseous substance; and associated with each said tower, means for controlling flow, said means for controlling flow including means for providing an adsorbent material adsorption cycle and means for providing an adsorbent material reactivation cycle, said means for controlling flow providing for at least one alternation of said adsorbent material adsorption cycle and said adsorbent material reactivation cycle, each said alternation not exceeding about one hundred twenty minutes duration;

said means for providing said adsorbent material adsorption cycle including means for introduction into said tower of said second gaseous substance, whereby said second gaseous substance flows through said tower at higher pressure in a generally upward direction, said first gaseous substance is substantially adsorbed by said adsorbent material, and said third gaseous substance is discharged from said tower;

said means for providing said adsorbent material reactivation cycle including means for introduction into said tower of purge fluid whereby said purge fluid flows through said tower at lower pressure in a generally downward direction, said first gaseous substance is substantially desorbed from said adsorbent material, and said purge fluid accompanied by some said first gaseous substance is discharged from said tower, the temperature of said purge fluid being higher and not exceeding about three hundred degrees Fahrenheit during an earlier period of said adsorbent material reactivation cycle, the temperature of said purge fluid being lower during a later period of said adsorbent material reactivation cycle, said earlier period commencing near the beginning of said adsorbent material reactivation cycle and not exceeding about seventy percent of the duration of said adsorbent material reactivation cycle.

7. Apparatus as in claim 6, wherein said means for controlling flow includes means for regulating pressure of said second gaseous substance which is introduced into each said tower.

8. Apparatus as in claim 6, wherein said means for controlling flow includes means for filtering free moisture and particulate matter from said second gaseous substance which is introduced into each said tower.

9. Apparatus as in claim 6, wherein said adsorbent material is selected from the group consisting of activated aluminas, activated carbons and zeolite.

10. Apparatus as in claim 6, wherein said means for controlling flow includes means for providing at least two said adsorbent material adsorption cycles and means for providing at least two said adsorbent material reactivation cycles, said means for controlling flow providing for at least two said alternations of said adsorbent material adsorption cycle and said adsorbent material reactivation cycle, wherein:

said earlier period of said adsorbent material reactivation cycle is a heat burst period for significantly boosting desorption, said heat burst period being of sufficiently short duration and sufficiently low temperature that the adsorption efficiency loss of said adsorbent material is minimized;

said later period is a cooling period for said adsorbent material; and said heat burst period and said cooling period serve to significantly augment adsorption performance of the next said adsorbent material adsorption cycle.

11. Apparatus as in claim 10, wherein said means for controlling flow includes:

means for selecting at least one reactivation cycle variable in furtherance of reactivating said adsorbent material such that a desired reduction in concentration of said first gaseous substance is accomplished during the subsequent said adsorbent material adsorption cycle;

said reactivation cycle variables including the choice of said adsorbent material, the temperature of said heat burst period, the duration of said heat burst period, the duration of said reactivation cycle, the flow rate of said purge fluid, and the pressure of said purge fluid.

12. Apparatus as in claim 6, comprising at least two said towers, wherein said means for controlling flow includes means for cycling said second gaseous substance alternately between said at least two said towers whereby:

at least one said tower is undergoing said adsorbent material adsorption cycle virtually concurrently as at least one said tower is undergoing said adsorbent material reactivation cycle; and a portion of said third gaseous substance which is discharged from said at least one said tower which is undergoing said adsorbent material adsorption cycle is used as said purge fluid for said at least one said tower which is undergoing said adsorbent material reactivation cycle.

13. Apparatus as in claim 6, wherein said first gaseous substance is water vapor, said adsorbent material is a desiccant, said adsorbent material adsorption cycle is a desiccant adsorption cycle and said adsorbent material reactivation cycle is a desiccant reactivation cycle.

14. Apparatus as in claim 13, wherein:

said second gaseous substance is air;

said third gaseous substance which is discharged from said tower is dehydrated air;

the pressure dewpoint of said dehydrated air is about $-60°$ F.;

the pressure of said air is about 3000–4500 psig; and one said desiccant adsorption cycle has a duration of about thirty minutes.

15. Apparatus for adsorbing water vapor from hydrated gas so as to obtain dehydrated gas, said apparatus comprising:

at least one tower containing a desiccant which is characterized by relative inefficiency of adsorbing said water vapor from said hydrated gas and by relative efficiency of being desorbed of said water vapor;

for at least one said tower, means for effecting at least one desiccant adsorption cycle and means for effecting at least one desiccant reactivation cycle, whereby there is at least one alternation of a said desiccant adsorption cycle and a said desiccant reactivation cycle, each said alternation not exceeding about one hundred twenty minutes duration;

said means for effecting at least one desiccant adsorption cycle including means for introducing said hydrated gas into said tower whereby said hydrated gas flows through said tower at a relatively high pressure in a substantially upward direction, said water vapor is substantially adsorbed by said desiccant, and said dehydrated gas is discharged from said tower; and said means for effecting at least one desiccant reactivation cycle including means for introducing purge fluid into said tower whereby said purge fluid flows through said tower at a relatively low pressure in a substantially downward direction, said water vapor is substantially desorbed from said desiccant, and said purge fluid accompanied by some said water vapor is discharged from said tower, said means for introducing purge fluid including means for effecting a temperature increase of said purge fluid toward the beginning of said desiccant reactivation cycle and for effecting a temperature decrease of said purge fluid toward the end of said desiccant reactivation cycle, said temperature decrease cooling said desiccant subsequent to said temperature increase, said temperature increase being to a temperature not exceeding about three hundred degrees Fahrenheit, said temperature increase not exceeding about seventy percent of the duration of said desiccant reactivation cycle, said temperature increase being of sufficiently long duration and to a sufficiently high temperature as to significantly boost desorption of said desiccant and being of sufficiently short duration and to a sufficiently low temperature as to minimally impair the adsorption efficiency of said desiccant.

16. Apparatus for adsorbing water vapor as in claim 15, wherein said hydrated gas is introduced into at least two said towers and said purge fluid is introduced into at least two said towers, and further comprising means for substantially synchronizing said desiccant adsorption cycle for at least one said tower with said desiccant reactivation cycle for at least one other said tower, whereby said purge fluid which is introduced in correspondence with at least one said desiccant reactivation cycle is derived from said dehydrated gas which is discharged in correspondence with at least one said desiccant adsorption cycle.

17. Apparatus for adsorbing water vapor as in claim 16, comprising:

means for selecting at least one reactivation cycle variable in furtherance of reactivating said desiccant such that a desired reduction in dewpoint is accomplished during said desiccant adsorption cycle; said reactivation cycle variables including the choice of said dessicant, the temperature of said temperature increase, the duration of said temperature increase, the duration of said reactivation cycle, the flow rate of said purge fluid, and the pressure of said purge fluid.

18. Apparatus for adsorbing water vapor as in claim 16, wherein said temperature increase is to a temperature not exceeding about 200° F., the pressure dewpoint of said dehydrated gas is about −60° F. at about 3000–4500 psig, and the duration of at least one said desiccant adsorption cycle is about thirty minutes.

19. Apparatus for adsorbing water vapor as in claim 15, wherein said desiccant is selected from the group consisting of activated aluminas, activated carbons and zeolites.

20. Apparatus for adsorbing water vapor as in claim 15, wherein said apparatus is suitable for service in applications typically having short operating periods and frequent interruptions often accompanied by high gas pressure.

* * * * *